US007294945B2

(12) United States Patent
Hormann

(10) Patent No.: US 7,294,945 B2
(45) Date of Patent: Nov. 13, 2007

(54) GATE OR DOOR DRIVE HOUSING

(75) Inventor: Michael Hormann, Oerlinghausen (DE)

(73) Assignee: Marantec Antriebs-und Steuerungstechnik GmbH & Co. KG, Marienfeld (DE)

( * ) Notice: Subject to any disclaimer, the term of this patent is extended or adjusted under 35 U.S.C. 154(b) by 0 days.

(21) Appl. No.: 10/791,416

(22) Filed: Mar. 1, 2004

(65) Prior Publication Data

US 2004/0245259 A1 Dec. 9, 2004

(30) Foreign Application Priority Data

Feb. 28, 2003 (DE) .......................... 203 03 315 U

(51) Int. Cl.
*H02K 5/00* (2006.01)

(52) U.S. Cl. ........................................ 310/89; 361/752

(58) Field of Classification Search .................. 310/89; 220/780; 361/752; 174/559, 561
See application file for complete search history.

(56) References Cited

U.S. PATENT DOCUMENTS

| | | | | |
|---|---|---|---|---|
| 4,653,565 | A * | 3/1987 | Iha et al. | 160/193 |
| 5,010,688 | A * | 4/1991 | Dombrowski et al. | 49/362 |
| 5,936,842 | A * | 8/1999 | Kaiser et al. | 361/752 |
| 6,301,103 | B1 * | 10/2001 | Abboud | 361/683 |
| 2002/0164158 | A1 * | 11/2002 | Hoermann | 388/835 |

FOREIGN PATENT DOCUMENTS

| | | | |
|---|---|---|---|
| DE | 3726685 | | 2/1989 |
| DE | G9420529 | | 3/1995 |
| DE | 29802199 | | 6/1999 |
| GB | 2069767 | A * | 8/1981 |

* cited by examiner

*Primary Examiner*—Dang Le
*Assistant Examiner*—Nguyen Hanh
(74) *Attorney, Agent, or Firm*—Dilworth & Barrese, LLP

(57) ABSTRACT

The invention relates to a gate or door drive housing with a basic carrier body for preference in the shape of a bowl or shell, to which various different drive components can be secured, and a cover hood which can be connected to the basic carrier body. According to the invention, a housing extension for accommodating additional and/or larger drive components can be connected in a releasable manner in an exact fit to the basic carrying body.

2 Claims, 9 Drawing Sheets

GATE OR DOOR DRIVE HOUSING

BACKGROUND OF THE INVENTION

The present invention relates to a gate or door drive housing with a basic carrier body for preference in the shape of a bowl or shell, to which various different drive components can be secured, and a cover hood which can be connected to the basic carrier body.

Gate or door drives, such as garage door drives, are usually arranged in a housing which, in the case of a garage door drive, is secured to the roof inside the garage. Usually arranged inside the housing are the drive motor and a gear drive system, which drives a carriage or slide element by means of a chain or belt, which runs on a rail connected to the housing. The garage door is secured to the slide element such that it can be opened or closed.

With such gate or door drives it would be desirable for the drive housing to be able to be used for different drives or for door drives equipped with different or additional drive components. Hitherto, however, different housings have usually been used for differently configured gate or door drives, in order not to sacrifice the advantage that in each case a small design of housing can be used. This practice, however, incurs high costs, inasmuch as a separate housing must be manufactured and kept available for each drive type.

SUMMARY OF THE INVENTION

The present invention is based on the problem of providing an improved gate or door drive housing of the type referred to, which avoids the disadvantages of the prior art and develops them further in an advantageous manner. For preference, the drive housing should be capable of being used for drive systems which are of different configurations.

According to the invention, this problem is resolved by a drive housing in accordance with the description herein. Preferred embodiments of the invention are also described herein.

According to the invention, therefore, an extension of the housing in order to accommodate more or larger drive components is provided for, which can be connected as a precise fit to the basic carrying body but can also be detached from it. The door drive housing according to the invention therefore has a modular design and consists of several housing modules from which the housing can be assembled in accordance with the drive components which are to be used in each case. The housing is, in particular, capable of being assembled variably in different sizes, as a result of which the number of parts which need to be kept available can be considerably reduced. Without extending the housing, the housing is formed solely from the basic carrying body and the cover hood located on this if required. In the event of additional drive components being adopted, which would have no space in the basic configuration of the housing, the housing extension can be fitted.

In a further development of the invention, the housing extension consists of a carrying body extension which is connected to the basic carrying body in a releasable manner, and an additional cover hood, which can at least be connected to the carrying body extension. The housing extension can in this situation have a cover hood which covers only the carrying body extension, and to this extent supplements the cover hood located on the basic carrying body, whereby in this case provision is made for preference for the additional cover hood of the housing extension to connect as an exact fit to the cover hood located on the basic carrying body.

In an alternative further embodiment of the invention, however, provision can be made for the cover hood of the housing extension to replace the basic cover and to extend both over the basic carrying body as well as over the carrying body extension connected to this, and to delimit a common housing interior. Accordingly, if the basic carrying body is extended by the housing extension, a new cover hood is fitted, which covers the entire extended carrying body.

For preference the carrying body extension has an edge contour which can be connected seamlessly to the outer edge contour of the basic carrying body. The carrying body extension is in this situation for preference shaped in such a way that, together with the basic carrying body, it forms an extended carrying bowl or shell, into which the desired drive components can be placed. The carrying bowl or shell formed from the basic carrying body and the carrying body extension can in this case have a circumferential edge web, onto which the suitably fitting cover hood can be placed.

The carrying body extension can basically take different forms, in order to be able to accommodate the drive components desired in each case. To advantage, the carrying body extension can form a ring which can be placed with its inner contour on the outer contour of the basic carrying body. It is understood in this situation that different carrying body extensions can be placed on the same basic carrying body, in order for the gate or door drive housing to be adapted individually to the drive components which are to be accommodated in each case. For preference, the basic carrying body has a circumferential edge or a circumferential edge web, onto which the inner contour of the carrying body extension can be set. With the housing extension removed, the non-extended cover hood is set on the said edge web of the basic carrying body.

In order to obtain a stable connection between the housing extension and the basic carrying body, the carrying body extension has for preference positive-fit connecting means to secure it to the basic carrying body. For preference, the positive-fit connection means exhibit a flange which engages over the edge of the basic carrying body and/or lug-shaped securing eyes, through which the carrying body extension can be secured by screw bolts to the basic carrying body. As an alternative to this, the positive-fit connection means could also exhibit locking engagement means, with the aid of which the carrying body extension can be locked onto the basic carrying body.

In a further development of the invention, the housing extension is itself also designed to be modular. The carrying body extension can consist of several parts, which can be connected to one another and/or releasably connected to the basic carrying body. The different extension parts can be assembled in different combinations, so that different sized or differently shaped carrying body extensions can be assembled.

For preference the extension parts have in this situation positive-fit connection means, by means of which they can be locked to one another in positive fit. To advantage, flexible locking engagement tongues and complementary locking engagement recesses can be provided on the extension parts. The locking connection achieved as a result allows on the one hand for a rapid assembly of the extension parts, and, on the other, achieves a secure connection of the parts to one another. For preference the extension parts additionally have two positive-fit connection means, with the aid of which they can be secured in positive fit to the basic carrying body. As a result of this the rapid fitting of individual parts to the basic carrying body can be ensured.

The basic carrying body itself can be of different designs. To the purpose, however, it normally accommodates at least the drive motor itself, a gear drive system, and a control device for the door drive. For this purpose, the basic carrying body has appropriate accommodation means, which have raised securing flanges opposite the plate-shaped basic surfaces, onto which flanges the individual drive components can be located and secured in an exact fit.

On the outside, the basic carrying body can for preference have positive-fit connection means, with which the basic carrying body can be connected to a rail for a carriage or slide element, on which the door drive slide element runs, which on the one hand is driven by means of a drive chain or drive belt by the drive motor mounted in the housing, and, on the other, causes the gate or door to be moved.

BRIEF DESCRIPTION OF THE DRAWINGS

The invention is explained in greater detail hereinafter on the basis of a preferred embodiment example and drawings pertaining thereto. The drawings show.

DESCRIPTION OF THE PREFERRED EMBODIMENTS

Figure 1:
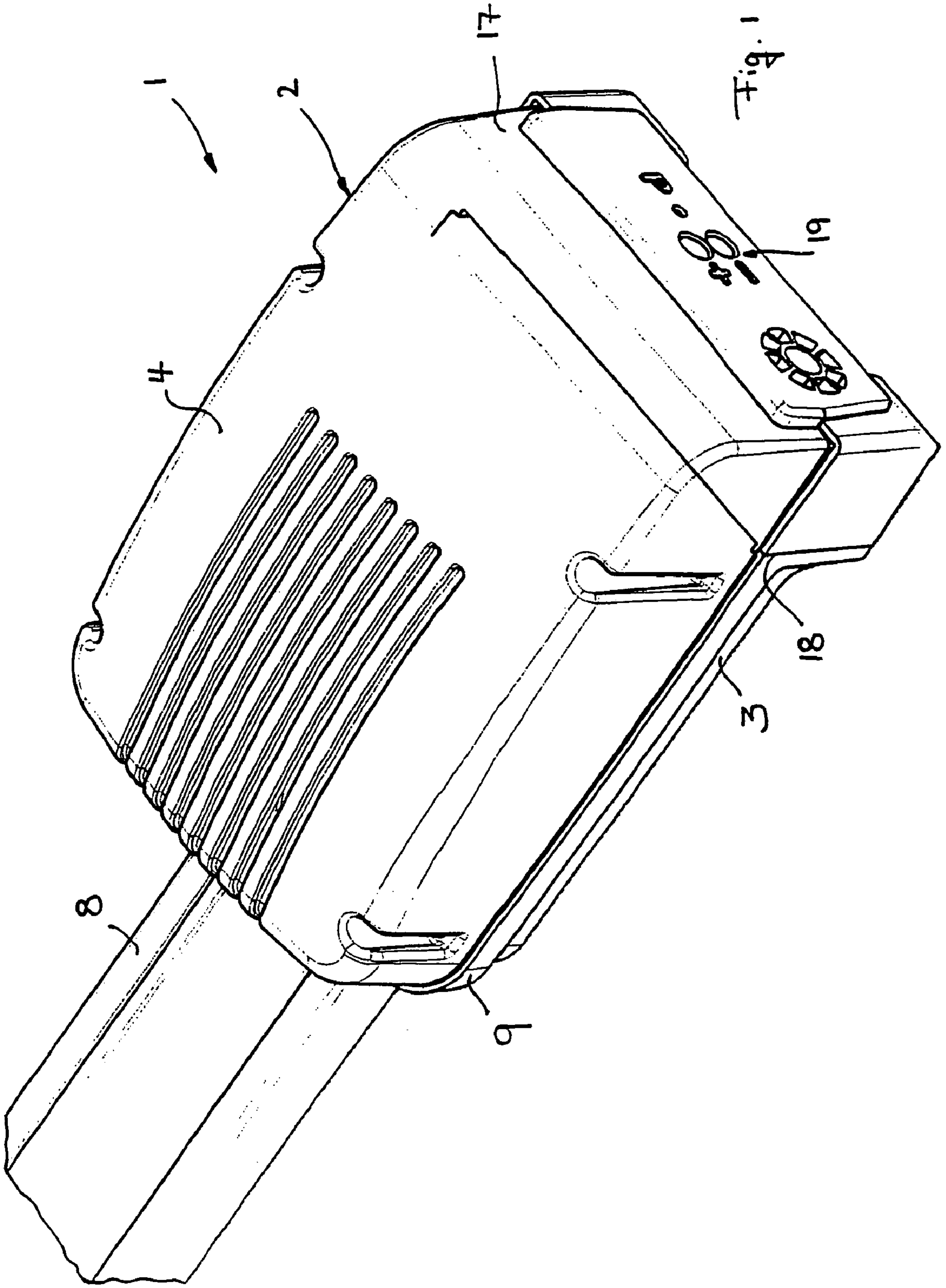
FIG. 1: A perspective overall view of a gate or door drive housing according to a preferred design of the invention, with a basic carrying body and a cover hood placed on this.
Figure 2:
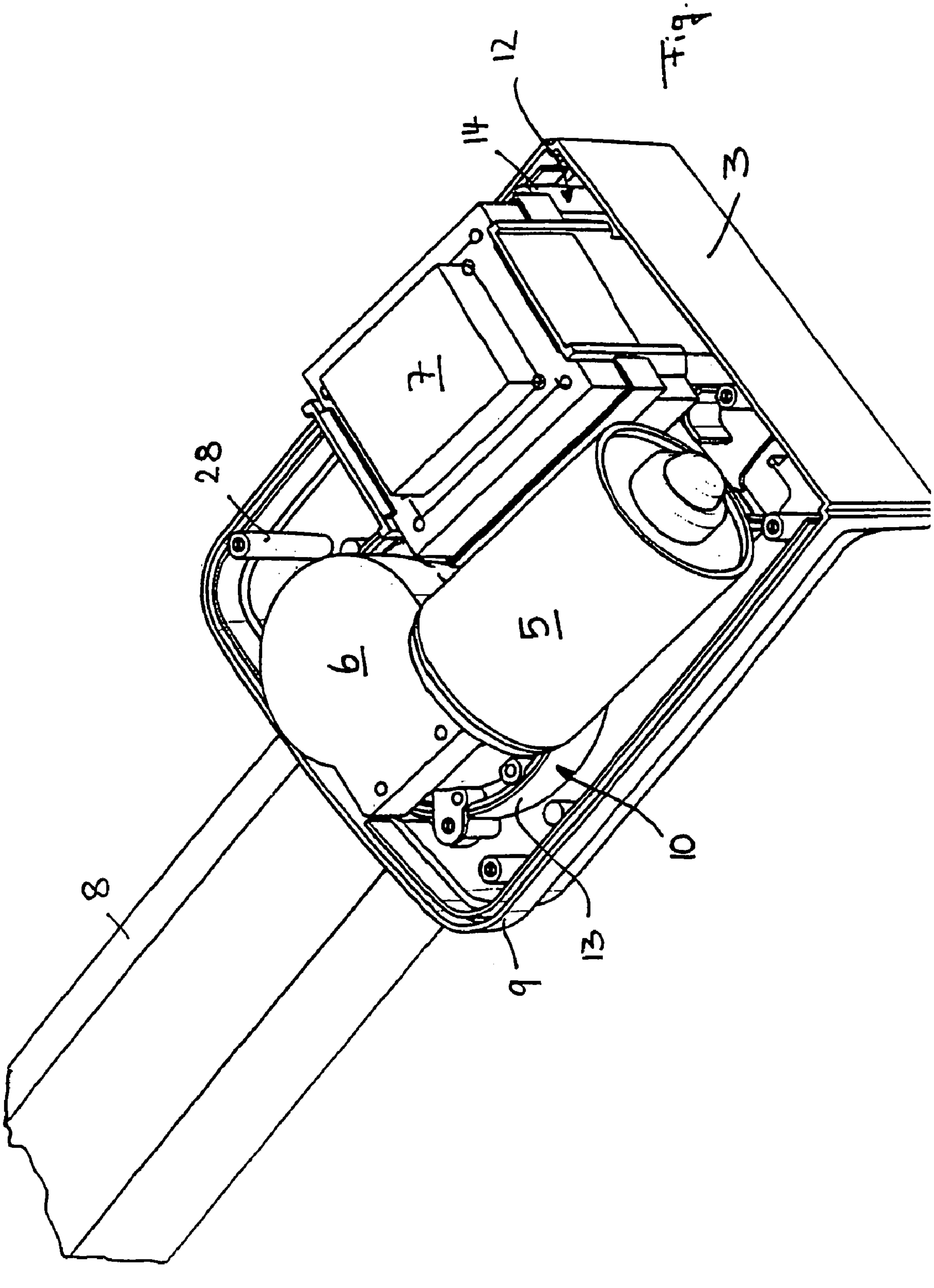
FIG. 2: The gate or door drive housing from FIG. 1 with the cover hood taken off, so that the drive components mounted on the basic carrying body can be seen.

The gate or door drive 1 according to FIGS. 1 and 2 comprises a door drive housing 2, which consists of a basic carrying body 3 and a cover hood 4 placed on this. As FIG. 2 shows, arranged in the interior of the door drive housing 2 are a drive motor 5, a gear drive system 6, and an electronic control device 7, located on the basic carrying body 3. The door drive housing 2 is located on a slide element rail 8, in which runs a belt or chain, driven by the drive motor 5 via the drive system 6, in order to drive a door slide element mounted on the slide element rail 8.

Figure 3:
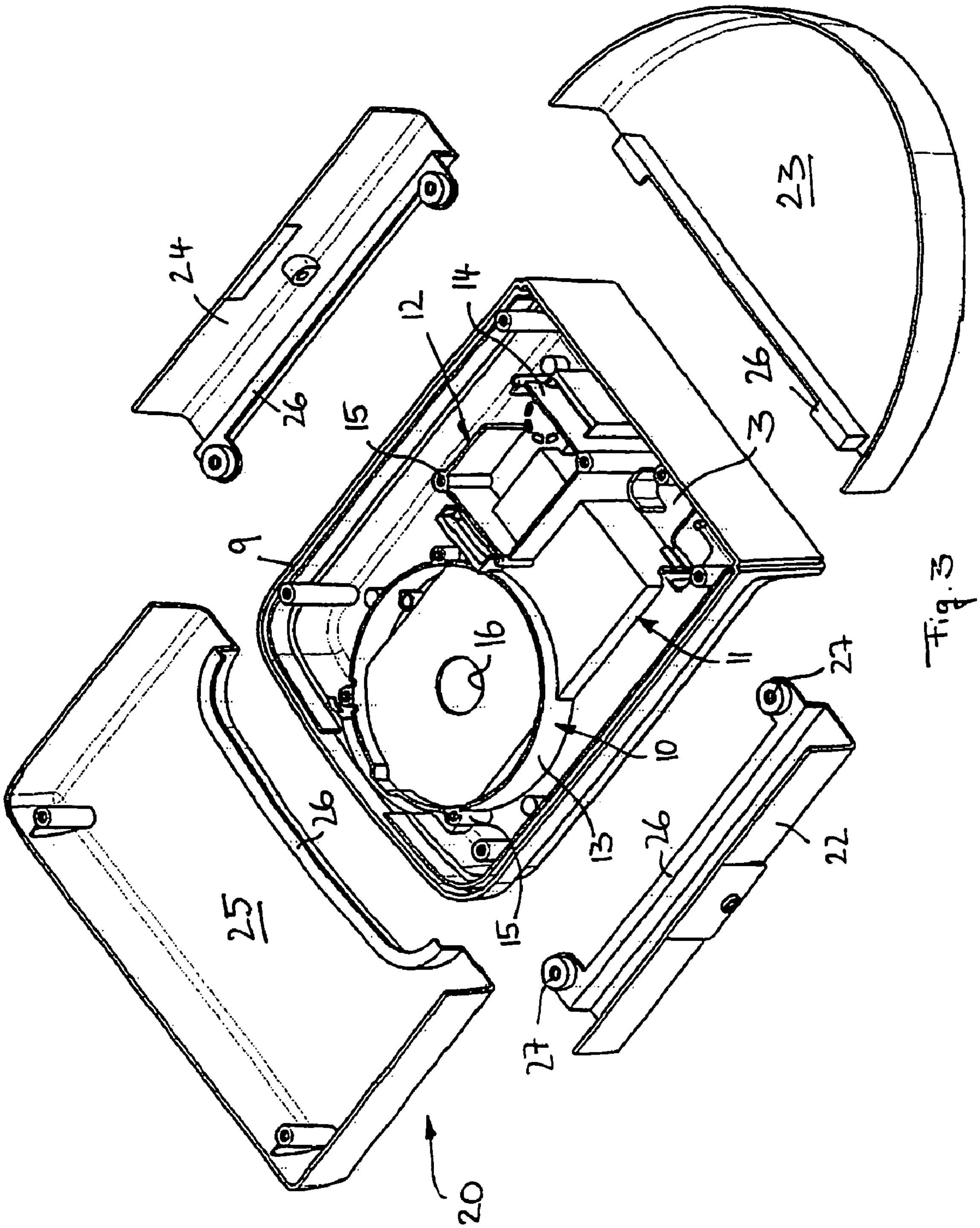
FIG. 3: The basic carrying body of the housing from the foregoing figures, with extension parts, not yet fitted, of a housing extension.

As FIG. 3 shows, the basic carrying body 3 is, roughly speaking, designed approximately in plate shape, whereby a circumferential edge web 9 is provided at the edge, which is formed as a double wall with a groove formed in it, running along three sides of the basic carrying body 3. The cover hood 4 can be placed as an exact fit onto the edge web 9 or into the groove formed in it. On its inside the basic carrying body 3 has first, second, and third recesses 10, 11, and 12, in each case for securing the drive motor 5, the drive system 6, and the control device 7, whereby the recesses 10, 11, and 12 in each case comprise raised securing flanges projecting inwards, onto which the corresponding drive components can be placed. In this situation, securing eyes 15 are formed at the flanges 13, 14, into which screw bolts can be screwed for securing the individual components. In the area of the drive system recess 10, the basic carrying body 3 has a circular drive shaft recess 16, through which a drive shaft of the drive unit can pass in order to be able to drive the chain or belt running in the slide element rail 8.

The cover hood 4 according to FIG. 1 has on its face side an overhang 17, with which it engages around the basic carrying body 3 from a corresponding face side. The edge contour 18 of the cover hood 4, with which the cover hood is located on the edge web 9 of the basic carrying body 3, has at the overhang a shaped run, bent approximately at right angles, forming a step to the overhang 17, such that the connection between the cover hood 4 and the basic carrying body 3 lies not in one single plane but is effected at surfaces which are inclined at an angle to one another. This allows for increased stability to be achieved.

On the face side of the overhang 17 operating interfaces 19 can be provided, such as, for example, connections or radio transmitters/receivers for operating the control device 7.

In order to be able to accommodate additional drive components in the door drive housing 2, such as a light cabinet device, additional control components, etc., a housing extension 20 can be connected to the basic carrying body 3, by means of which the interior of the door drive housing 2 is extended. As FIG. 3 shows, the housing extension 20 comprises a carrying body extension 21, which consists of four extension parts 22, 23, 24, and 25. Each of the extension parts 22 to 25 can in each case be mounted in an exact fit to one of the four sides of the basic carrying body 3, whereby it is understood that the carrying body extension 21 can also be divided into fewer than or more than four parts. With the design of the basic carrying body 3 shown in the figures, which is essentially rectangular in shape, it has been shown to be of advantage, however, if the carrying body extension 21 consists of four parts.

The carrying body extension 21 in this situation comprises two identically formed side parts 22 and 24 as well as two differently shaped face parts 23 and 25. The extension parts 22 to 25 are supplemented by a ring, of which the inner contour corresponds to the outer contour of the basic carrying body 3. The inner contour of the ring-shaped carrying body extension 21, composed of the extension parts 22 to 25, exhibits in this situation an angled securing flange 26, with which the inner contour of the carrying body extension 21 engages over the edge web 9 of the basic carrying body 3 and connects as an exact fit to the basic carrying body 3. The extension parts 22 to 5 can in this situation be connected on the one hand to one other and, on the other, they can be secured to the basic carrying body 3.

Figure 5:
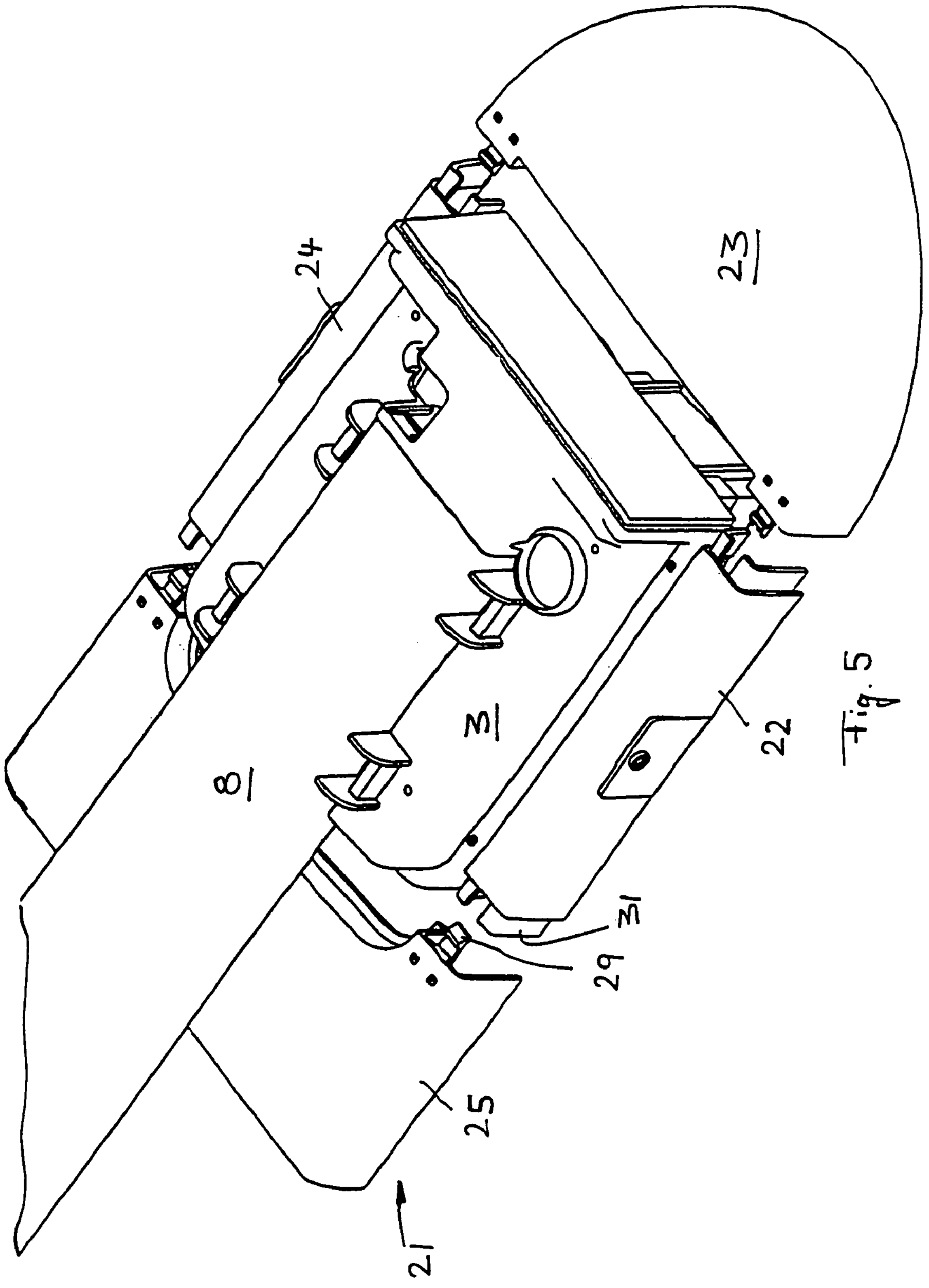
FIG. 5: A perspective view of the basic carrying body from the outside, whereby a rail for a slide element is connected to the basic carrying body and whereby two side parts of the housing extension are already secured to the basic carrying body, while two further housing extension parts are not yet secured.

As FIG. 5 shows, the opposed side parts 22 and 24 can in the first instance be placed on the basic carrying body 3. At their securing flange 26, the said side parts 22 and 24 have shaped securing eyes 27, through which screw bolts can be guided with which the side parts 22 and 24 can be screwed securely to the basic carrying body 3. As FIG. 3 shows, the basic carrying body 3 has screw recesses 28 for this purpose, on which the securing eyes 27 lie in contact and into which the corresponding screws can be screwed.

Figure 6:
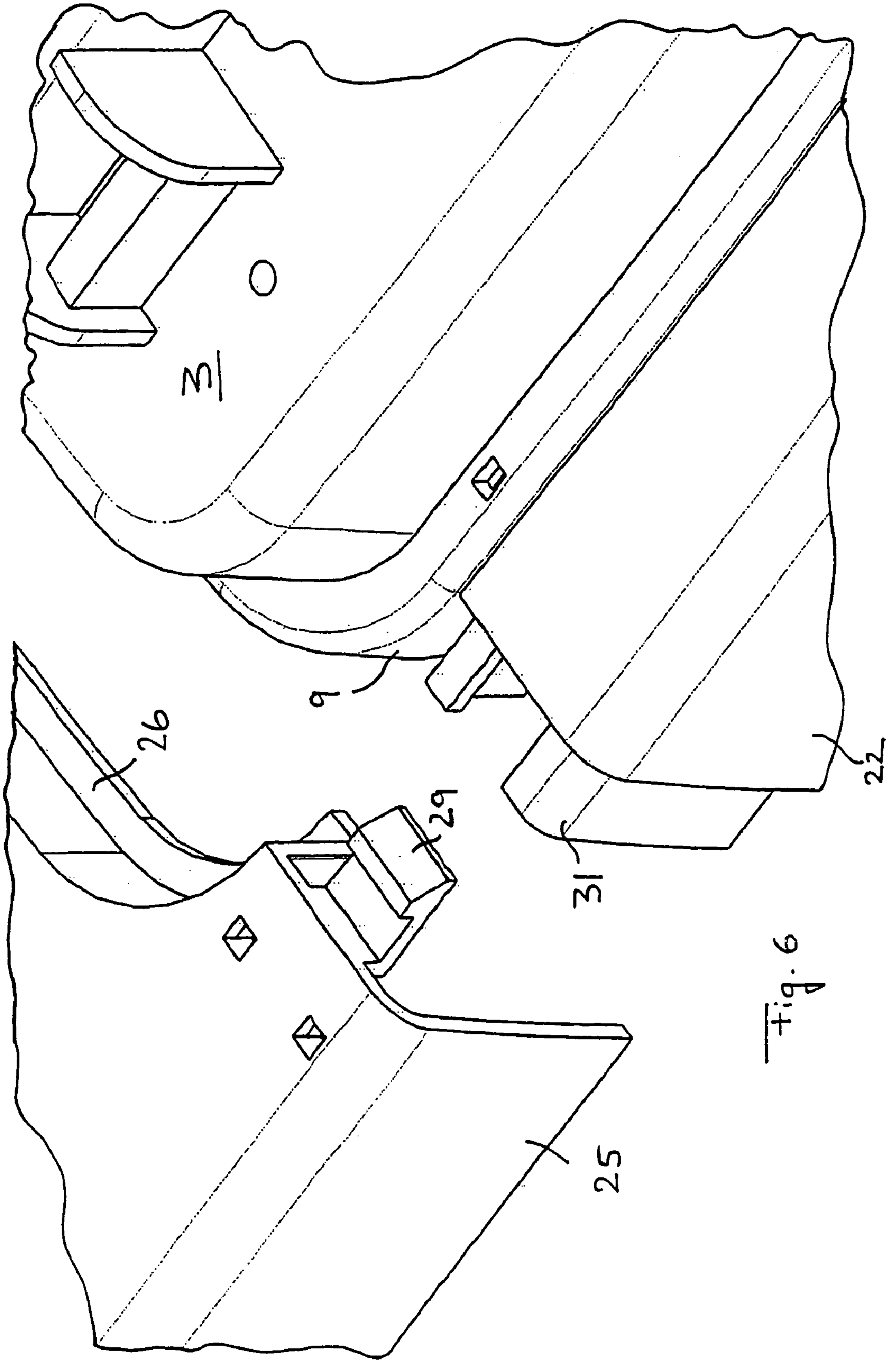
FIG. 6: An enlarged sectional representation of the locking engagement connection between two housing extension parts in a perspective view from the outside.
Figure 7:
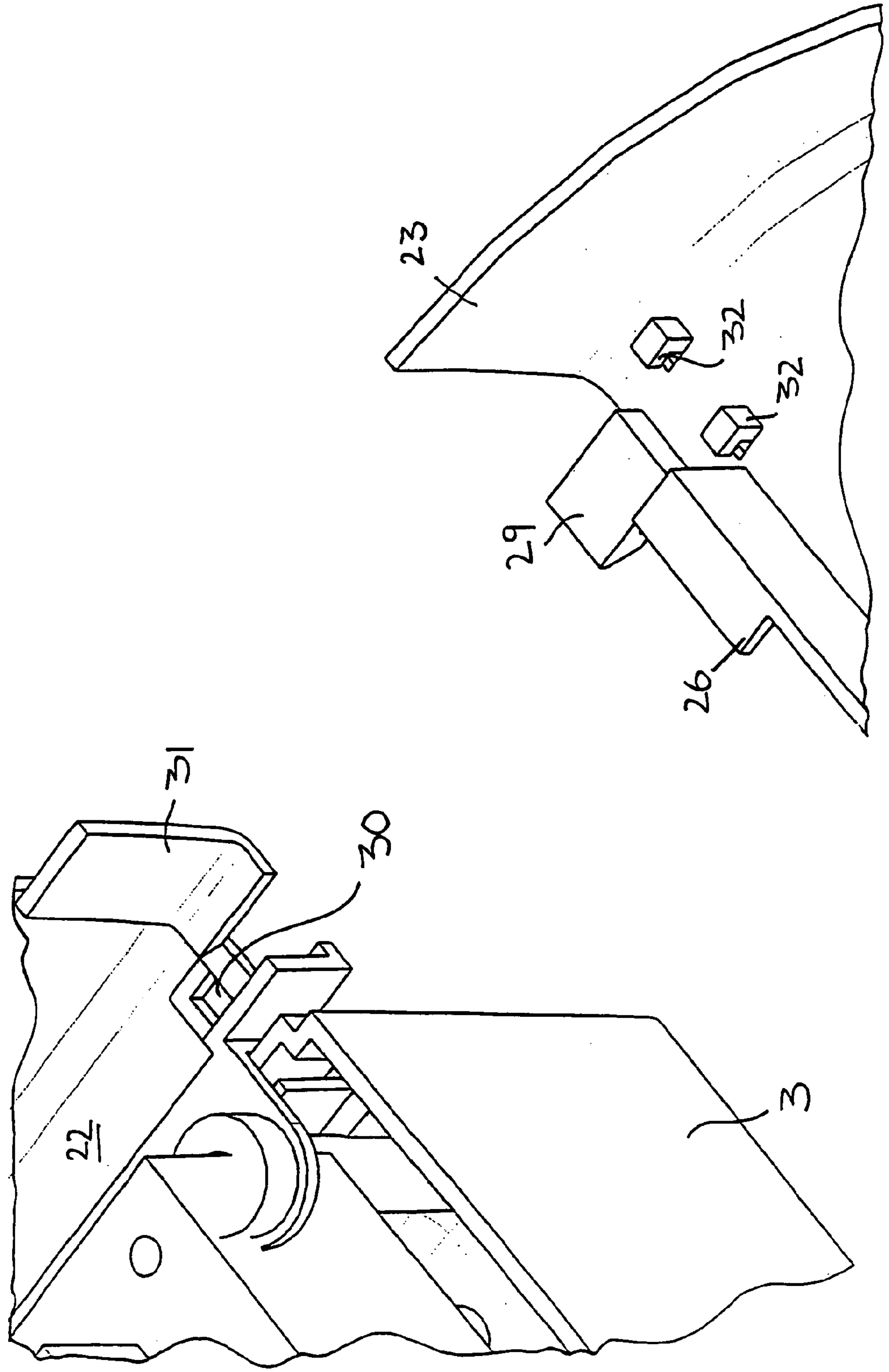
FIG. 7: An enlarged sectional representation of the locking engagement connection between the two housing extension parts from FIG. 6, in a perspective representation from one inner side of the housing.

The face parts 23 and 25 are locked in engagement with the side parts 22 and 24. As FIGS. 6 and 7 show, axially projecting locking engagement tongues 29 are formed in each case at the face parts 23 and 25, while the side parts 22 and 24 have complementary shaped engagement recesses 30 on their inside, into which the locking engagement tongues 29 can engage when the axially projecting locking engagement tongues 29 are pushed over the side parts 22 and 24 under initial elastic deformation. In order to give the connection additional stability, axially projecting overlapping parts 31 are formed at the side pieces 22 and 24, which slide in an exact fit over the inner contour of the side pieces 23 and 24. In addition, mounting claws 32 are provided at the face parts 23 and 25, into which the overlapping pieces 31 can be pushed, so that they are gripped by the mounting claws 32. For preference the overlapping pieces 31 have a bent contour, which corresponds to the likewise bent contour of the face parts at their edge web, as a result of which increased rigidity of the connection can be achieved. As FIG. 7 shows, the locking engagement tongues 29 and their overlapping pieces 31 grip one another in fork fashion and in each case engage above the connecting piece of the side piece or face piece respectively.

Additional rigidity is provided to the connection of the face parts 23 and 25 with the side pieces 22 and 24 by the formation of the securing flange 21 at the face pieces, which are in face contact at the edge contour of the basic carrying body 3 at two mutually inclined planes.

Figure 8:
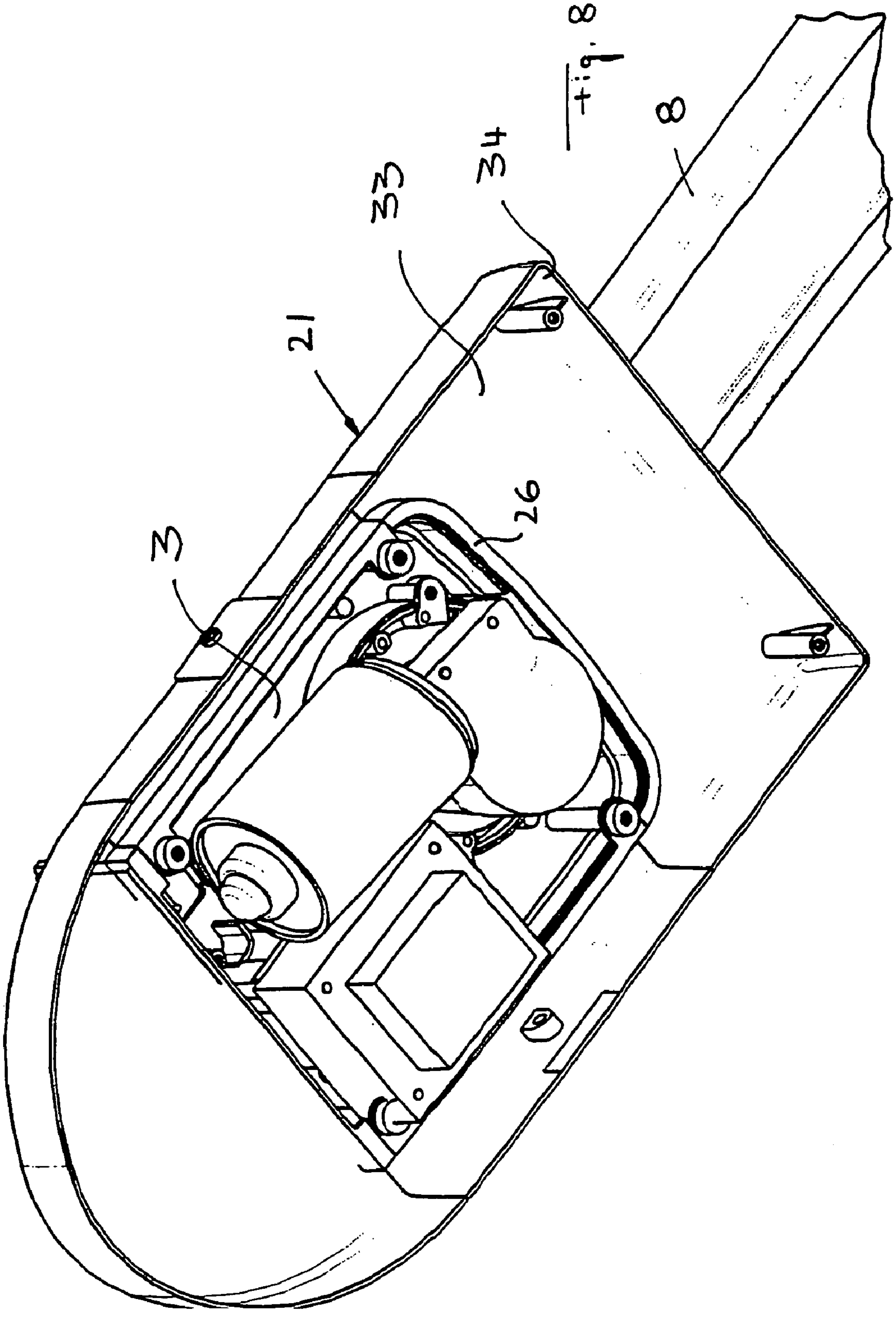
FIG. 8: A perspective plan view of the inside of the extended carrying bowl or shell, consisting of the basic carrying body and the carrying body extension secured to this.

As FIG. 8 shows, the carrying body extension 21 and the basic carrying body 3 together form an extended carrying bowl or shell 22 with more space for accommodating further drive components. The extended carrying bowl or shell 33 has in this situation a circumferential edge web 34, which is composed of the corresponding edge webs of the extension parts 22 to 25. The edge web 34 of the extended carrying bowl or shell 33 in this situation is located elevated opposite the edge web 9 of the basic carrying body 3.

Figure 9:
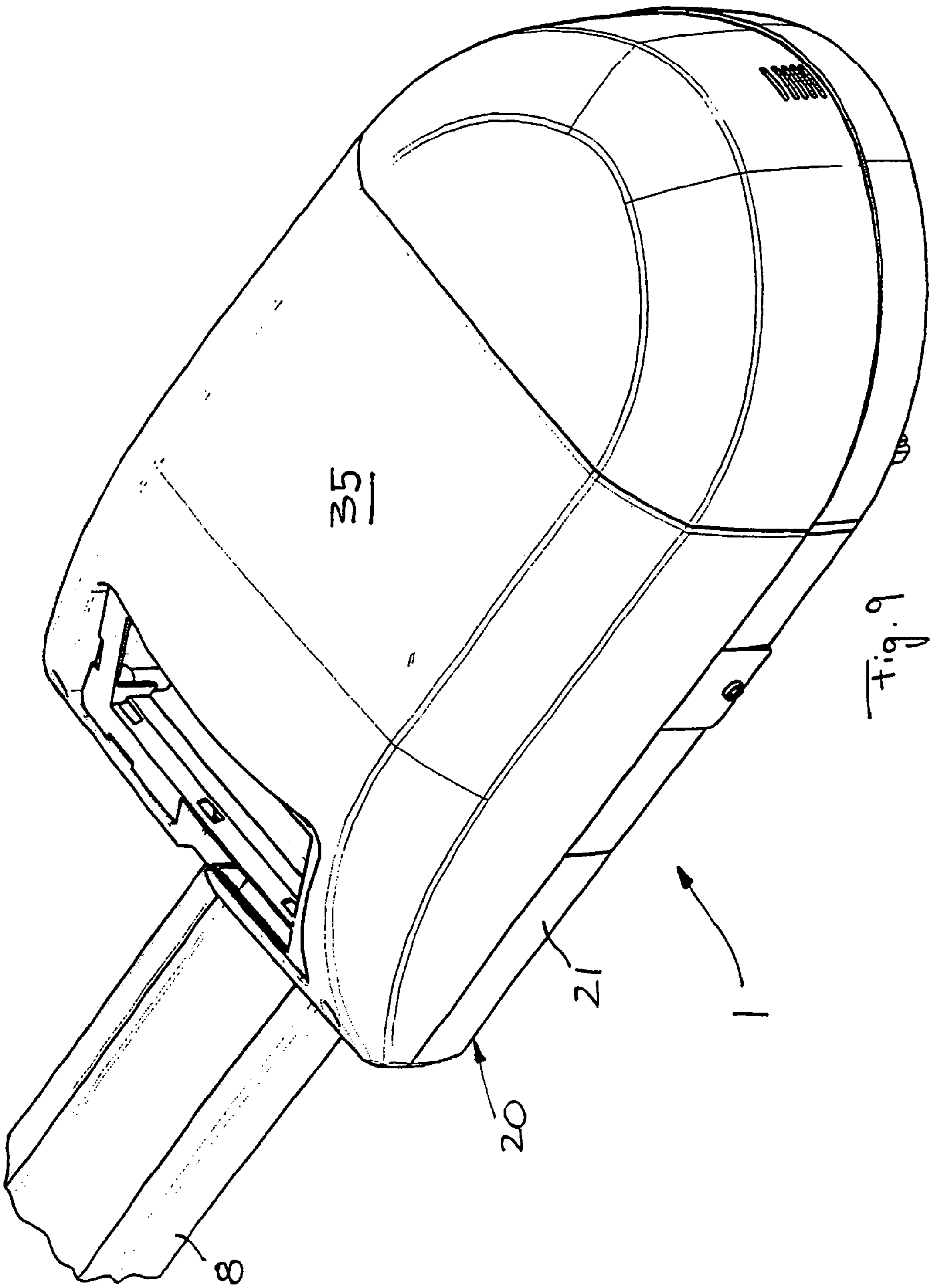
FIG. 9: An overall perspective view of the housing, extended by the housing extension, similar to FIG. 1.

An enlarged cover hood 35 can be placed on the extended carrying bowl or shell 33, which to the purpose is located on the edge web 34, as shown in FIG. 9. If appropriate, the cover hood 35 can consist of several cover hood parts, so that, if appropriate, different housing sections can be opened individually.

The housing parts can in principle be manufactured from one metal sheet, but for preference they are plastic injection-moulded parts.

Figure 4:
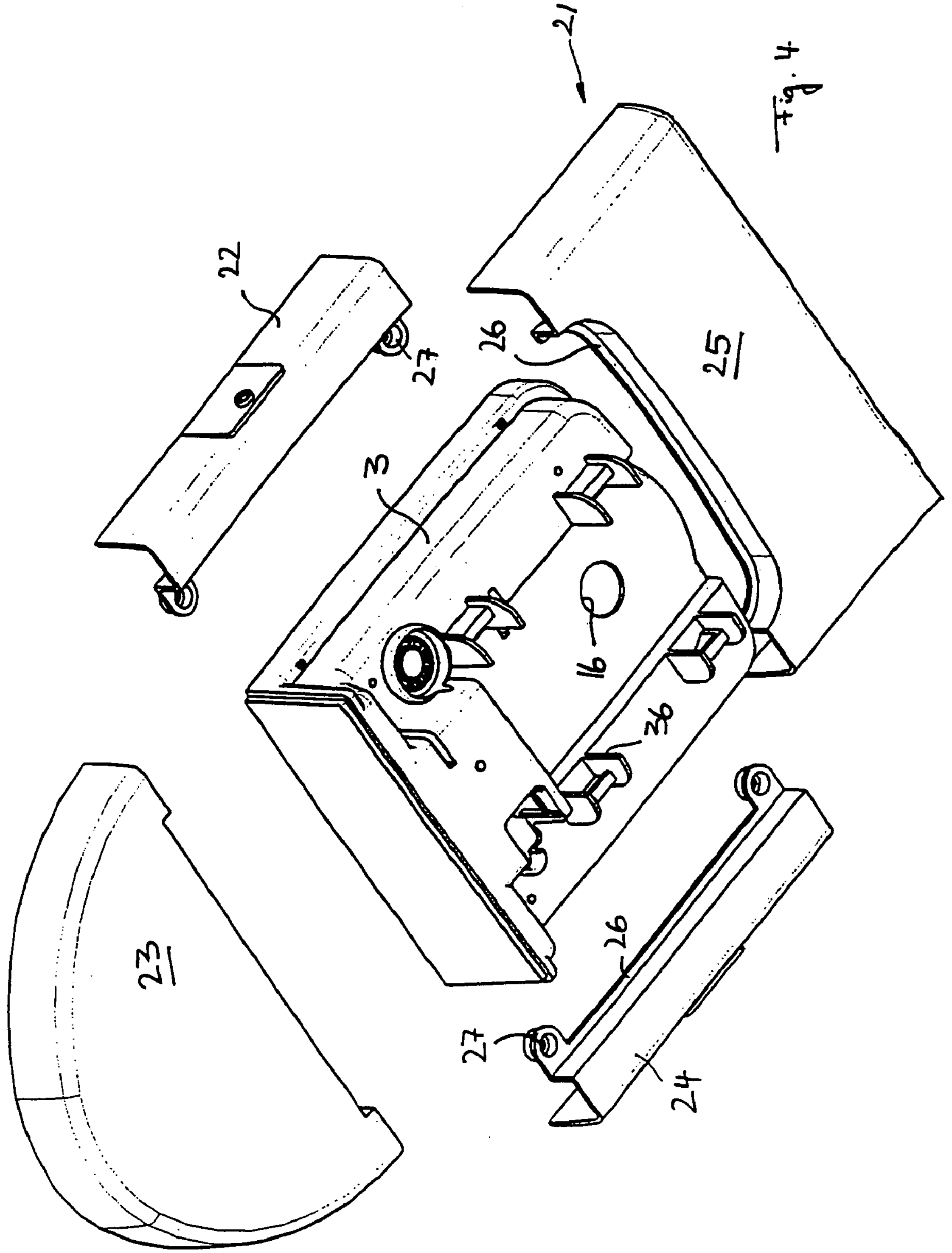
FIG. 4: The basic carrying body with the housing extension parts in a perspective view from the outside.

As FIGS. 4 and 5 illustrate clearly, the basic carrying body 3 has on its underside connection means 36 for the exact fit connection of the slide element rails 8, whereby in the embodiment shown the connection means 36 comprise an indentation corresponding to the contour of the slide element rail 8, as well as laterally projecting securing webs.

The invention claimed is:

1. A gate or door drive housing, comprising a bowl or shell-shaped basic carrying body (3) structured and arranged to have different drive components (5, 6, 7) secured thereto, a cover hood (4, 35) structured and arranged to be connected to the basic carrying body (3), and a housing extension (20) structured and arranged to be connected in an exact fit and detachable manner to the basic body (3) on front, rear and lateral sides thereof and accommodate additional and/or larger drive components, the basic carrying body (3) comprising a first recess (11) for accommodating a drive motor (5), a second recess (10) for accommodating a drive system (6) and a third recess (12) for accommodating a control device (7), said three recesses (11, 10, 12) being separated from one another by elevated securing flanges (13, 14), and said housing extension (20) also comprising at least one recess for accommodating more and/or larger drive components, wherein the housing extension (20) comprises a carrying body extension (21), structured and arranged to be connected in a releasable manner to the basic carrying body (3), and a cover hood (35), structured and arranged to be connected at least to the carrying body extension (21), wherein the carrying body extension (21) comprises a connection contour (26) structured and arranged to be connected seamlessly to an outer contour (9) of the basic carrying body (3) and, with the basic carrying body (3), together forms an extended carrying bowl or shell (33), the carrying body extension (21) forms a ring, which can be located with its inner contour at the outer contour (9) of the basic carrying body (3), the carrying body extension comprises parts (22, 23, 24, 25) structured and arranged to be releasably coupled to at least one of one another and the basic carrying body (3) and having first positive-fit connection means (29, 30) for positive fit connection to one another and second positive-fit connection means (27) for positive-fit securing to the basic carrying body (3), the carrying body extension comprises a securing flange (26) on its inner contour, engaging over the edge of the basic carrying body (3), and the first positive-fit connection means (29, 30) comprise locking engagement tongues (29) and complementary locking engagement recesses (30) for locking engagement with one another, the gate or door drive housing comprising four distinct parts (22, 23, 24, 25), a front face part (23), a rear face part (25) and two side parts (22, 24), said front and rear face parts (23, 25) each comprising a recess for accommodating more and/or larger drive components, wherein each said side part (22, 24) additionally comprises an axially-projecting, overlapping part (31) arranged to slide, in an exact fit, over an inner contour of the front (23) and rear (25) face parts, and said front and rear end parts (23, 25) additionally each comprise at least one mounting claw (32) situated on an inner surface thereof and arranged to receive and grip a respective overlapping part (31) upon coupling, to provide additional stability and rigidity.

2. A gate or door drive housing, comprising:

a bowl or shell-shaped basic carrying body (3) structured and arranged to have different drive components (5, 6, 7) secured thereto, a cover hood (4, 35) structured and arranged to be connected to the basic carrying body (3), and a housing extension (20) structured and arranged to be connected in an exact fit and detachable manner to the basic body (3) on front, rear and lateral sides thereof and accommodate additional and/or larger drive components, the basic carrying body (3) comprising a first recess (11) for accommodating a drive motor (5), a second recess (10) for accommodating a drive system (6) and a third recess (12) for accommodating a control device (7), said three recesses (11, 10, 12) being separated from one another by elevated securing flanges (13, 14), said door or gate drive housing including four distinct parts (22, 23, 24, 25), a front face part (23), a rear face part (25) and two side parts (22, 24), and each said side part (22, 24) additionally comprise an axially, protective overlapping part (31) arranged to slide in an exact fit, over an inner contour of the front (23) and rear (25) face parts and said front and rear end parts (23, 25) additionally comprising at least one mounting claw (32) situated on an inner surface thereof and arranged to receive and grip a respective overlapping part (31) upon coupling, to provide additional stability and rigidity.

* * * * *